3,063,970
ALKYL, ETHENYL ESTERS OF PINIC ACID AND POLYMERS THEREOF
Glen W. Hedrick, Lake City, Fla., assignor to the United States of America as represented by the Secretary of Agriculture
No Drawing. Filed Apr. 25, 1960, Ser. No. 24,635
29 Claims. (Cl. 260—78.5)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to alkyl, ethenyl esters of pinic acid, methods for producing the same, and to certain polymeric derivatives thereof. More particularly, the invention relates to mono- and dialkyl pinates, vinyl alkyl pinates derivable therefrom, divinyl pinate, and polymers prepared from these vinyl esters.

A primary object of the present invention is to provide methods of reacting the two carboxyl groups of pinic acid selectively and independently, to prepare pure mono- and mixed pinic acid esters. A further object of the invention is to provide methods for preparing at will either half ester of the dibasic pinic acid, that is the acetic acid form or the 3-carboxycyclobutane form of half ester, which half esters are useful for the selective synthesis of a host of mixed esters and amides of the acid, including polyamides and polyesters. Other objects are to provide novel vinyl alkyl pinates, their homopolymers, and copolymers of the vinyl alkyl pinates with vinyl chloride; and to provide divinyl pinate useful in the preparation of polymeric materials.

Direct monoesterification of commercially important dibasic organic acids like adipic acid and azelaic acid is not selective, a considerable portion of these acids being converted to diester during the esterification. We have found, however, that due to the unique structure of pinic acid, direct monoesterification of this acid can be accomplished in a selective manner according to the process of our invention to produce high yields of the half ester in which the acetic acid moiety of pinic acid is esterified. It has also been discovered that half saponification of either symmetrical or mixed dialkyl pinates preferentially saponifies the ester group of the acetate portion of the diester. Thus, it is possible by the processes of the present invention to prepare substantially any of the pure alkyl half esters of pinic acid. These pure alkyl half esters of pinic acid can be readily esterified, either by direct esterification with a suitable alcohol or via the acid chloride, to produce pure mixed dialkyl pinates or pure symmetrical dialkyl pinates. The pure alkyl half esters of pinic acid can also be readily converted to the corresponding vinyl alkyl pinate by vinylation and vinyl acetate using a vinyl interchange method.

The following schematic diagram shows in general how the various pinic acid esters mentioned above are produced according to our invention:

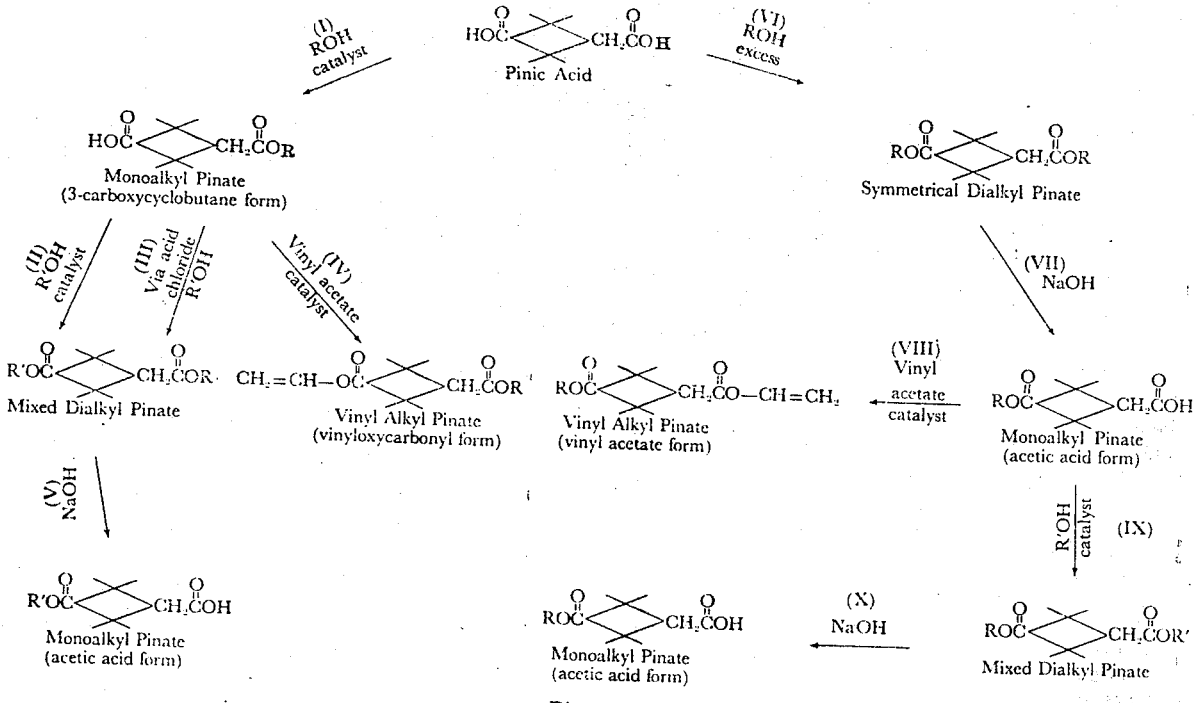

Diagram

As will be readily apparent to those skilled in the art, the R and R′ groups of the pinic acid esters in the diagram can be provided by substantially any of the alcohols conventionally employed for the esterification of organic carboxylic acids. Examples of suitable R and R′ groups include alkyl groups, such as ethyl, n-butyl, 2-ethylhexyl, and the like; and substituted alkyl groups, such as hydronopyl and the like.

The direct monoesterification of pinic acid to produce the monoalkyl pinates (3-carboxycyclobutane form) (reaction I of the diagram) can be conveniently carried out by reacting equimolar quantities of pinic acid and the appropriate alcohol in the presence of a suitable, unreactive organic solvent and a conventional esterification catalyst. It is generally preferred to employ benzene as the solvent and p-toluene sulfonic acid as the catalyst, and to conduct the reaction at the reflux temperature of the reaction mixture, removing the water formed in the reaction by azeotropic distillation. It is usually desirable to continue the esterification until the reaction is substantially complete as indicated by acid number determinations. Following completion of the esterification reaction, the isolation and recovery of the monoalkyl pinate can be accomplished without difficulty using conventional procedures such as phasic separations, distillations and the like. In the preferred procedure, the cooled reaction mixture is first washed with water to remove the catalyst and then, to avoid formation of emulsions, is adjusted to a suitable alkaline pH by the addition of a buffered aqueous alkali solution, prior to removal of any diester formed as a byproduct in the esterification by extraction with a solvent such as ether or benzene. Adjustment to a pH between about 7 and 8 is generally suitable in the case of the lower monoalkyl pinates. In the case of higher monoalkyl pinates, such as the 2-ethylhexyl and the hydronopyl monoesters, the pH should be maintained at about 9.5 to 10, and the amount of dilution controlled so that about 1 liter of water and 1 liter of solvent are present for each mole of pinic acid charged, to avoid the formation of stable emulsions. (The sodium salts of the higher monoalkyl pinates are particularly good emulsifiers; at a pH of 7, very stable emulsions are formed). The diesterfree aqueous solution is then acidified, and the resultant monoester product is isolated and distilled in vacuo in the conventional way.

The other type of monoalkyl pinate, i.e. the acetic acid form, can be produced by several routes according to our invention. This type half ester can be produced from conventional, symmetrical dialkyl pinates (by reaction VII of the diagram), or from mixed dialkyl pinates (by reaction V or X of the diagram). Each of the three aforementioned half saponification reactions can be readily carried out by reacting equimolar quantities of the particular dialkyl pinate and alkali in a suitable unreactive solvent until the half-saponification reaction is substantially complete. It is generally preferred to employ ethanol as the solvent, and sodium hydroxide as the saponifying alkali. It is usually desirable to heat the reaction mixture to speed up the saponification. A reaction temperature of about 70° C. is generally adequate. Following completion of the half-saponification reaction, the isolation and recovery of the monoalkyl pinate (acetic acid form) can be accomplished using conventional procedures such as phasic separations, distillations and the like. A preferred procedure is to remove the solvent under reduced pressure, dilute the reaction mixture with water, remove any unreacted diester by extraction with an organic solvent, then acidify the aqueous phase with mineral acid and extract the monoester with a suitable solvent, such as ether or benzene. After removal of solvent, the monoester product is vacuum distilled in the conventional manner. Care must be taken to control the volumes and alkalinity during the extraction of unreacted diester, as described above for the preparation of the monoalkyl pinates (3-carboxycyclobutane form) by direct monoesterification of pinic acid, to avoid the formation of stable emulsions.

In addition to having useful emulsification applications, the two types of monoalkyl pinates prepared as described above can be used to prepare useful resin-forming monomers for polyesters, polyamides, or ester amides; to prepare pure mixed dialkyl pinates, and if desired the symmetrical dialkyl pinates; and to prepare novel vinyl alkyl pinates having utility in the production of polymers.

According to the present invention, various dialkyl pinates can be prepared either by direct esterification of the appropriate monoalkyl pinate with the appropriate alcohol (reactions II and IX of the diagram) or by reaction of the acid chloride of the monoalkyl pinate with the appropriate alcohol (reaction III of the diagram). Symmetrical dialkyl pinates can be prepared by direct esterification employing a monoalkyl pinate and an alcohol having the same alkyl group (reaction II of the diagram). In carrying out the direct esterification (reaction II or IX of the diagram) it is preferred to react equimolar quantities of the monoalkyl pinate and the appropriate alcohol in the presence of a suitable, unreactive organic solvent like benzene and a conventional esterification catalyst. The preferred catalyst is p-toluene sulfonic acid. It is preferred to conduct the esterification at the reflux temperature of the reaction mixture, removing the water formed in the reaction by azeotropic distillation and continuing the reaction until it is substantially complete. Following completion of the esterification, the mixed dialkyl pinate can be readily isolated and purified using conventional methods. The preferred procedure is to wash the reaction mixture with water, then with dilute alkali, and finally with water; to remove the solvent; and then to distill the diester product in vacuo.

The mixed dialkyl pinates can be prepared by reacting equimolar quantities of the acid chloride of the monoalkyl pinate and the appropriate alcohol (reaction III of the diagram), in the presence of a suitable, unreactive organic solvent and an alkaline agent, such as soda ash, to absorb the hydrogen chloride liberated in the reaction. It is generally preferred to carry out the reaction at reflux temperature. After completion of the reaction, the reaction mixture is washed with water, stripped of solvent, and the diester product is vacuum distilled in the usual way. The mixed dialkyl pinates of the type produced by reaction III of the diagram, have a novel utility. The R group, introduced by monoesterification according to reaction I, can be from a cheap, easily obtainable alcohol. The R' group, introduced subsequent to the R group, can be from an expensive, difficult-to-obtain alcohol. Upon half saponification of the mixed dialkyl pinate (reaction V of the diagram), the resulting monoalkyl pinate contains the R' group at the 3-carboxy position. This monoester can thereby be produced at considerable saving of R'OH over what would be required if the conventional symmetrical dialkyl pinate (containing two R' groups) is first produced and then half saponified to yield the same monoalkyl pinate.

Vinyl alkyl pinates are produced according to the present invention by vinylating either the 3-carboxycyclobutane form of monoalkyl pinate (by reaction IV of the diagram) or the acetic acid form of monoalkyl pinate (by reaction VIII of the diagram). The preferred method is to vinylate the monoesters with vinyl acetate using a conventional vinyl interchange procedure. It is generally preferred to employ a large stoichiometric excess of vinyl acetate, and to carry out the vinylation at about room temperature in the presence of a copper resinate polymerization inhibitor and a mercury salt of a strong acid as catalyst. After the vinylation reaction is completed, the excess vinyl acetate is preferably removed under reduced pressure at a temperature between about 20° and 30° C. The crude, vinyl acetate-free ester is then dissolved in ether or some other suitable organic solvent, and treated to remove catalyst and any unreacted monoester by washing with dilute aqueous mineral acid, then with dilute aqueous sodium hydroxide buffered to pH 8 to 9 with sodium carbonate, and finally, with water. The aforementioned washing procedure is desirable, since it decreases the still residue. After the washing is completed, the solvent is stripped and the vinyl alkyl pinate isolated by vacuum distillation according to conventional procedures.

The novel vinyl alkyl pinates of this invention have utility in the production of polymers. These vinyl esters homopolymerize readily to yield homopolymers having low softening points. Homopolymers of various molecular weights can be produced. The vinyl alkyl pinates copolymerize readily with vinyl chloride to yield copolymers of a variety of compositions. These copolymers are rigid plastics, which can be processed at lower processing temperatures than those required for processing the conventional poly(vinyl chloride-vinyl acetate) copolymers.

The following examples are given by way of illustration and not by way of limitation of the invention.

EXAMPLE 1

Monoalkyl Pinates (Acetic Acid Form) by Half Saponification of Symmetrical Dialkyl Pinates 2,2 - dimethyl - 3 - (ethoxycarbonyl)cyclobutaneacetic acid.—Diethyl pinate, 800 g. (3.3 moles), prepared by conventional direct esterification of pinic acid, was dissolved in 1 liter of 95 percent ethanol. To this a solution consisting of 132 g. (3.3 moles) sodium hydroxide dissolved in 132 ml. water was slowly added while stirring. The reaction mass warmed to about 70° C. and the pH changed from about 14 initially to between 7 and 8 at the end of the reaction. The ethanol was removed under reduced pressure and the residue was diluted with one to two liters water. The unreacted diester was extracted with ether or benzene and isolated by evaporation of the solvent. Diester recovered was 80 g. (10 mole percent).

The aqueous phase was acidified with mineral acid and again extracted as above to remove pinic acid and monoester. The combined extracts were dried over anhydrous sodium sulfate, the solvent evaporated and the residue distilled in vacuo using an 18 inch Vigreux column. The distillate when seeded with pure 2,2-dimethyl-3-(ethoxycarbonyl)cyclobutaneacetic acid gave a solid mass of crystals. The yield of monoester was 565 g. (80 mole percent), n.e. 214, and of pinic acid, B.P. 163–165° C. (0.2 mm.), was 61.5 g., 10 mole percent. Separation of the products of the saponification by distillation was considerably easier when the diester was removed as described.

The physical and chemical characteristics of the monoester (2,2 - dimethyl - 3 - ethoxycarbonylcyclobutaneacetic acid are given in Table I.

2,2 - dimethyl - 3 - (n-butoxycarbonyl)cyclobutaneacetic acid; 2,2-dimethyl-3-(2-ethylhexyloxycarbonyl)-cyclobutaneacetic acid; and 2,2-dimethyl-3-(hydronopyloxycarbonyl)cyclobutaneacetic acid.—These three monoalkyl pinates were prepared by half saponification of di-n-butyl pinate, di-2-ethylhexyl pinate, and dihydronopyl pinate, respectively, using the same general procedure and ratio of reactants employed above for preparing the monoethyl pinate. In preparing the 2-ethylhexyl monoester and the hydronopyl monoester, one liter of solvent and one liter of water were used per mole of ester charged, and the aqueous phase was maintained at pH 9.5 to 10 by addition of 1 N sodium hydroxide buffered with sodium carbonate, to avoid formation of stable emulsions. (Since the sodium salts of these higher monoalkyl pinates are particularly good emulsifiers, maintaining the aqueous phase at a pH of 7 is unsatisfactory and leads to the formation of very stable emulsions.) When benzene was used as the solvent the extraction was carried out hot. In all cases removal of the neutral, unreacted diester facilitated separation of the residual components. The extent of saponification and yield was independent of the diester used. The composition of each of the monoalkyl pinate products was calculated from neutralization and saponification equivalents. The physical and chemical characteristics of the various monoalkyl pinates are given in Table I. All of these esters exhibited a strong absorbance in the infrared at 7.5 microns, attributable to the presence of the alkoxycarbonyl group in the esters.

TABLE I.—MONOALKYL PINATES (ACETIC ACID FORM)

| | B.P., °C. | Mm./ Hg | Composition, percent | | | Neutral equivalent | | Saponification equivalent | | Refractive index $n_D^{20}$ | Density $d^{20}$ |
|---|---|---|---|---|---|---|---|---|---|---|---|
| | | | a[1] | b[1] | c[1] | Calcd. | Found | Calcd.[2] | Found | | |
| R=Ethyl | 128 | 0.2 | | 100 | | 214.3 | 214.3 | 107.1 | 107.1 | 1.4569 | 1.0736 |
| n-Butyl | 142 | 0.25 | | 97.6 | | 242.3 | 233.2 | 120.2 | 120.1 | 1.4588 | 1.0407 |
| 2-ethylhexyl | 171 | 0.15 | 2.4 | 90.0 | 10.0 | 298.4 | 331.0 | 155.3 | 154.8 | 1.4554 | 0.9901 |
| Hydronopyl | 202–8 | 0.45 | 0.8 | 99.2 | 0 | 336.5 | 330.3 | 166.8 | 166.1 | 1.4907 | 1.0572 |

[1] a=Pinic acid. b=Monoester. c=Diester.
[2] Theoretical S.E. calculated from N.E. found.

EXAMPLE 2

Monoalkyl Pinates (3-Carboxycyclobutane Form) by Direct Monoesterification

Ethyl 2,2-dimethyl 3 (carboxy)cyclobutaneacetate; N-butyl 2,2-dimethyl-3-(carboxy)cyclobutaneacetate; 2-ethylhexyl 2,2-dimethyl-3-(carboxy)cyclobutaneacetate; and hydronopyl 2,2-dimethyl-3-(carboxy)cyclobutaneacetate.—These four monoalkyl pinates were prepared by refluxing 186 g. (1 mole) of pinic acid and one mole of the appropriate alcohol in 480 ml. benzene containing 6 g. p-toluene sulfonic acid. When all the water from the reaction had been removed azeotropically and the acid number indicated the reaction was complete, the mass was cooled and washed with water to remove the sulfonic acid. Some of the unreacted pinic acid was removed in this wash. The batch was made alkaline by adding approximately 1 N sodium hydroxide buffered with sodium carbonate, care being taken to control the volumes and alkalinity for this extraction as described for the half esters of Example 1.

The diester-free aqueous solution was acidified and the monoester distilled as described in Example 1. The properties and data obtained from characterization of the monoesters are tabulated in Table II. In every case the saponification and neutral equivalent are in agreement, thus establishing the composition reported. None of these monoesters were found to absorb in the infrared at 7.5 microns as did the alkoxycarbonyl derivatives of Example 1.

TABLE II.—MONOALKYL PINATES (3-CARBOXYCYCLOBUTANE FORM)

| | B.P., °C. | Mm./ Hg | Composition, percent | | | Neutral equivalent | | Saponification equivalent | | Refractive index $n_D^{20}$ | Density $d^{20}$ |
|---|---|---|---|---|---|---|---|---|---|---|---|
| | | | a[1] | b[1] | c[1] | Calcd. | Found | Calcd.[2] | Found | | |
| R=Ethyl | 135 | 0.1 | 0 | 100 | 0 | 214.3 | 214.3 | 107.1 | 107.0 | 1.4583 | 1.0706 |
| n-Butyl | 139.5–144 | 0.3 | 0 | 99.5 | 0.5 | 242.3 | 243.6 | 121.3 | 120.2 | 1.4590 | 1.0462 |
| 2-ethylhexyl | 174 | 0.17 | 11.6 | 88.4 | 0 | 298.4 | 237.4 | 139.4 | 139.1 | 1.4569 | 1.0090 |
| Hydronopyl | 199 | 0.1 | 7.2 | 92.8 | 0 | 336.5 | 283 | 159.0 | 158.2 | 1.4899 | 1.0652 |

[1] a=Pinic acid. b=Monoester. c=Diester.
[2] Theoretical S.E. calcd. from N.E. found.

The acid chloride was prepared from the monoethyl pinate of Table II using thionyl chloride. The acid chloride, when added to liquid ammonia in ether, gave a liquid amide, B.P. 154° C. (0.3 mm.), $n_D^{20}$ 1.4817, $d^{20}$ 1.0738. Anal: Calcd. for $C_{11}H_{19}O_3N$: N, 6.57. Found: N, 6.57. Similarly, amides prepared from p-nitroaniline, p-aminobenzoic acid and ethylenediamine were all liquids.

EXAMPLE 3

Mixed Dialkyl Pinates From Monoalkyl Pinates

The mixed dialkyl pinates, having the structures and properties indicated in Table III, were prepared by reaction of the acid chloride of the monoalkyl pinate with the appropriate alcohol.

TABLE III.—MIXED DIALKYL PINATES

| Ethyl 2,2-dimethyl-3-(alkoxycarbonyl) cyclobutaneacetates 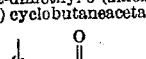 | B.P., °C. | Mm./Hg | Refractive index $n_D^{20}$ | Density $d^{20}$ | Saponification equivalent | |
|---|---|---|---|---|---|---|
| | | | | | Calcd. | Found |
| R=n-Butyl | 116 | 0.3 | 1.4470 | 0.9804 | 135.2 | 133.2 |
| 2-ethylhexyl | 151 | 0.3 | 1.4519 | 0.9610 | 163.2 | 162.4 |
| Hydronopyl | 181 | 0.1 | 1.4794 | 1.0201 | 182.3 | 184.0 |
| Alkyl 2,2-dimethyl-3-(ethoxycarbonyl) cyclobutaneacetates 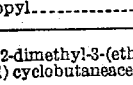 | | | | | | |
| R=n-Butyl | 120 | 0.3 | 1.4468 | 0.9863 | 135.2 | 134.8 |
| 2-ethylhexyl | 148 | 0.3 | 1.4516 | 0.9612 | 163.2 | 162.2 |
| Hydronopyl | 182 | 0.1 | 1.4796 | 1.0192 | 182.3 | 185.8 |

The following procedures are illustrative of the methods employed in making the mixed diesters of Table III.

*Alkyl 2,2-dimethyl-3-(ethoxycarbonyl)cyclobutaneacetates by direct esterification.*—2,2-dimethyl-3-(ethoxycarbonyl)cyclobutaneacetic acid, 78.7 g. (0.367 mole), prepared as described in Example 1, was esterified with hydronopyl alcohol, 61.8 g. (0.367 mole) in benzene, 200 ml., with 1 gm. p-toluene sulfonic acid as a catalyst. By distillation of the ester two fractions were taken; 3.4 g., B.P. 76 to 164° C. (0.2 mm.) and a main fraction, 112 g., B.P. 181° C. (0.1 mm.), with 5 g. still residue. There was no more than a few drops of diethyl pinate, if any, in the forecut.

Since the amount of the catalyst in this run was considerably less than used in the experiment above, another run was made increasing this reagent. From 85.6 g. (0.4 mole) of the ethoxycarbonyl ester using 5.5 g. p-toluene sulfonic acid the following fractions were obtained: 12.7 g., B.P. 103° C. (0.5 mm.) to 140° C. (0.1 mm.); 110.6 g., B.P. 140 to 246° C. (0.1 mm.), principally 185° C. (0.1 mm.) and 10.5 g., B.P. 246° C. (0.1 mm.) with 1.5 g. residue; 96% overall yield. These fractions were principally diethyl pinate, hydronopyl 2,2-dimethyl-3-(ethoxycarbonyl)cyclobutaneacetate, and dihydronopyl pinate, respectively.

*Ethyl 2,2-dimethyl-3-(alkoxycarbonyl)cyclobutaneacetates by use of acid chlorides.*—n-butyl and hydronopyl alcohols were reacted with ethyl 2,2-dimethyl-3-chlorocarbonylcyclobutaneacetate, prepared by reacting the ethyl 2,2-dimethyl-3-(carboxy)cyclobutaneacetate of Example 2 with thinoyl chloride. A typical example using hydronopyl alcohol is as follows: one mole of alcohol (168 g.) was dissolved in 500 ml. benzene in which 56 g. soda ash was kept suspended by agitation. The acid chloride, 232 g. (1 mole) was added dropwise while holding the reaction mass at reflux temperature. A small amount of water distilled which was collected in a decanter. After washing with water and stripping the solvent the product was distilled. There was a forecut, 12 g., B.P. 103 to 178° C. (0.25 mm.) and the mixed dialkyl pinate product, 266 g., 71% yield, B.P. 180 to 182° C. (0.1 mm.), with 32 g. still residue. An 86% yield of mixed diester was obtained with n-butyl alcohol.

EXAMPLE 5

Monoalkyl Pinates (Acetic Acid Form) by Half Saponification of Mixed Dialkyl Pinates The n-butyl, 2-ethylhexyl, and hydronopyl half esters of Table I, Example 1 and of Table II, Example 2, were vinylated to produce the respective mixed vinyl alkyl pinates and the latter were reduced to give the same mixed dialkyl pinates depicted in Table III, Example 4. These mixed dialkyl pinates were subjected to half saponification with sodium hydroxide according to the procedure described in Example 1. In each instance, the major product produced was substantially pure acetic acid form of monoalkyl pinate having the general structure given in Table I, Example 1. These experiments establish the configuration of the alkyl pinates with respect to the location of the alkyl substituents. Details of typical experiments are as follows:

*Half Saponification of Butyl 2,2-Dimethyl-3-(Ethoxycarbonyl)Cyclobutaneacetate*

Butyl 2,2-dimethyl-3-(ethoxycarbonyl) cyclobutaneacetate, 20.28 g., upon half saponification gave: (1) 0.8 g., B.P. to 126° C. (0.15 mm.), n.e. 212.2, calcd. for monoethyl pinate 214; (2) 10.2 g., B.P. 126 to 136° C. (0.15 mm.), n.e. 209.8 and (3) 1.2 g., B.P. 136 to 160° C. (0.15 mm.), n.e. 199.3. The concentration of monoethyl ester in each of these fractions was 99.2, 98.4 and 94.2 percent, respectively. Assuming a normal 80 percent conversion of diester to monoester obtained in a number of instances, a calculated yield of 12.84 g., was expected. These distillates contained only monoester and pinic acid. The yield of monethyl pinate was 11.97 g. or 93.4 percent of the expected quantity. Each of the fractions when seeded with pure 2,2-dimethyl-3-(ethoxycarbonyl) cyclobutaneacetic acid gave a solid mass of crystals.

*Half Saponification of Ethyl 2,2-Dimethyl-3-(n-Butoxycarbonyl)Cyclobutaneacetate*

From half saponification of 20.28 g. of ethyl 2,2-dimethyl-3-(n-butoxycarbonyl)cyclobutaneacetate the following fractions were obtained: (1) 0.5 g., B.P. to 140° C., (0.15 mm.), n.e. 227.6, calcd. for monobutyl pinate 242.3; (2) 11.7 g., B.P. 140–144° C., (0.15 mm.), n.e. 234.9; and (3) 2.0 g., B.P. 144–150° C., (0.15 mm.) n.e. 224.3. The concentrations of monobutyl ester were 96.2, 98.1 and 95 percent resp. The 12.86 g., of monobutyl pinate, that is, 2,2-dimethyl-3-(n-butoxycarbonyl) cyclobutaneacetic acid, obtained was 88.6 percent of the expected amount assuming 80 percent conversion.

EXAMPLE 6

Vinyl Alkyl Pinates

Vinyl 2,2-dimethyl-3-(ethoxycarbonyl)cyclobutaneacetate (by Reppe process).—2,2-dimethyl - 3 - (ethoxycarbonyl)cyclobutaneacetic acid, 214 g. (1 mole), and zinc oxide, 15.7 g. (0.19 mole), were added to 250 ml. toluene and heated to reflux to remove water by trapping in a decanter. The solution was almost clear, although some of the zinc salts remained undissolved. Glacial acetic acid, 13.8 g., was added to completely clarify the solution.

The toluene solution was charged to an Aminco rocking type autoclave of 1 liter capacity, heated to 120° C., flushed three times with nitrogen, and finally left under 100 pounds nitrogen pressure on the equipment. Acetylene was added to full tank pressure of 300 lbs. The batch was heated to 180° C. Acetylene absorption was complete in 4 hours. The autoclave was allowed to cool, the contents removed, washed with dilute sulfuric acid, water and dilute carbonate solution. The toluene was stripped under water-aspirator vacuum and the residue was distilled using a 24-inch Vigreux column. The following fractions were obtained: (1) 5 ml. 20° to 87.5° C., (0.4 mm.); (2) 50.1 g., 87.5° to 96° C., (0.4 mm.); (3) 52 g., 97° C., (0.5 mm.) to 99° C., (0.55 mm.). Five ml. of the 2nd and 3rd fractions polymerized violently when 0.3 percent benzoyl peroxide was added, indicating the formation of polymers from the vinyl esters. Both polymers were insoluble in acetone, benzene and methanol indicating crosslinking, presumably because of the presence of some divinyl pinate in the fractions.

*Vinyl 2,2-dimethyl - 3 - (ethoxycarbonyl)cyclobutaneacetate (by vinyl interchange reaction).*—2,2-dimethyl-3-(ethoxycarbonyl)cyclobutaneacetic acid, neutral equivalent 214, 455 g. (2.13 moles) was dissolved in 1193 g. (13.9 moles) freshly distilled vinyl actate containing 1.22 g. copper resinate. Mercuric acetate, 9.4 g. (0.029 mole), was dissolved therein while stirring at room temperature, then 2.33 g. (0.023 mole) concentrated sulfuric acid was added slowly. The final solution was clear and bright green in color. After standing 72 hours, 10 g. sodium acetate (0.12 mole) was added. The excess vinyl acetate was stripped by water-aspirator vacuum, maintaining the still residue at a temperature of 20° to 30° C. The crude ester was dissolved in 500 ml. ether. This solution was washed with dilute aqueous sulfuric acid, then with two 500 ml. portions of water made alkaline, pH 8 to 9, with a small amount of a solution containing 2 percent sodium hydroxide and 1.5 percent soda ash, and finally washing with water. Acidification of the alkaline extract gave 50 g. recovered starting material. Removal of the solvent under vacuum as above and distillation, bulb-to-bulb, gave 431 grams, B.P. 100° C., 1.9 mm. to 1.5 mm., with 30 g., residue. Redistillation at 2 mm. using a 24-inch Vigreux column gave the following fractions: (1) 10 g. up to 106° C., (2) 72 g., 106° to 111° C., (3) 28 g., 111° to 112° C., and (4) 300 g., 112° C.

The last three fractions were combined for removal of divinyl pinate by distillation through a 45 cm. column packed with extruded nickel. The composition and certain properties of the fractions of distillate collected are given in the following table:

| Fractions | B.P., °C., 2 mm. | Weight, g. | Composition[1] Percent | | Hydrogenation[2] equivalent |
|---|---|---|---|---|---|
| | | | A | B | |
| 1a | 104–108 | 16 | 95.1 | 4.9 | 1.97 |
| 2a | 108–111 | 17 | 95.1 | 4.9 | 1.97 |
| 3a | 111 | 11 | 11.1 | 88.9 | 1.11 |
| 4a | 111–113 | 49 | 1.8 | 98.2 | 1.02 |
| 5a | 113 | 21 | 1.4 | 98.6 | 1.01 |
| 6a | 113 | 210 | 1.4 | 98.6 | 1.016 |

[1] Calc., as (A) divinyl pinate, (B) vinylethyl pinate.
[2] Determined by hydrogenation in acetic acid solution with 5 percent palladium on carbon catalyst.

NOTE.—Residue, 55 g.

Fractions 4a through 6a were combined and the small amount of divinyl ester remaining therein was removed by distillation, using the nickel packed column at a high reflux ratio. The remainder of the charge was distilled at a more rapid rate. A sample of fraction 4a and samples of the final distillate (pure vinyl 2,2-dimethyl-3-(ethoxycarbonyl)cyclobutaneacetate, characteristics and properties given in Table IV below), with and without 2 percent added divinyl pinate (prepared as described in Example 7 below) were polymerized in bulk with benzoyl peroxide as the initiator. The polymers from 4a and the sample with added divinyl pinate were not soluble in benzene, thus indicating crosslinking. It is apparent that some divinyl pinate is produced by this vinyl interchange reaction in addition to the major product, the vinyl alkyl pinate.

*Vinyl 2,2-dimethyl-3-(n-butoxycarbonyl)cyclobutaneacetate and vinyl 2,2-dimethyl-3-(2-ethylhexyloxycarbonyl)cyclobutaneacetate.*—Vinylation of 2,2-dimethyl-3-(n-butoxycarbonyl)cyclobutaneacetic acid and 2,2-dimethyl-3-(2-ethylhexyloxycarbonyl)cyclobutaneacetic acid was accomplished by the vinyl interchange procedure used above for vinylating the 3-ethoxycarbonyl derivative. With the higher molecular weight esters the volume of vinyl acetate charged was increased. With the butyl ester 644 g. (7.48 moles) and with the 2-ethylhexyl ester 793 g. (9.22 moles) vinyl acetate were used per mole pinate ester. The properties of the two resultant vinyl alkyl pinates are given in Table IV below. Because of the higher boiling point of these higher molecular weight vinyl alkyl esters, it was easier to free them of divinyl pinate than in the case of the vinyl ethyl ester.

*Ethyl, n-butyl, 2-ethylhexyl and hydronopyl 2,2-dimethyl - 3 - (vinyloxycarbonyl)cyclobutaneacetates.*—Vinylation of ethyl, n-butyl, 2-ethylhexyl and hydronopyl 2,2-dimethyl-3-(carboxy)cyclobutaneacetates by reacting the respective mono esters with vinyl acetate as above resulted in 70 to 80 percent yields of the vinyl alkyl pinates. The quantity of vinyl acetate employed was increased for the higher molecular weight esters, as described above. The properties of these four vinyl alkyl pinates are given in the lower half of Table IV below. The following results are from a typical vinylation of 454 g. (2.12 moles) of the ethyl pinate, yielding 413 g. of crude ethyl vinyl pinate which distilled as follows:

| Fractions | B.P. °C., 2 mm. | Weight, g. | Composition[1] Percent | | Hydrogenation equivalent |
|---|---|---|---|---|---|
| | | | A | B | |
| 1 | 68 to 104 | 25 | | | |
| 2 | 105 to 112 | 48 | | | |
| 3 | 112 to 113 | 45 | 7.6 | 92.4 | 1.078 |
| 4 | 113 | 270 | 1.2 | 98.8 | 1.012 |
| | | | 0.8 | 99.2 | 1.009 |

[1] Calcd. as (A) divinyl pinate, (B) ethyl vinyl pinate.

The presence of the small amount of divinyl pinate in the above fractions was indicated by the hydrogenation data.

TABLE IV.—VINYL ALKYL PINATES

| (Vinyl acetate form)  | Hydrogenation equivalent | Boiling point | | $n_D^{20}$ | $d^{20}$ |
|---|---|---|---|---|---|
| | | °C. | mm./Hg | | |
| R=Ethyl | 0.99 | 113 | 2.0 | 1.4558 | 1.0220 |
| n-Butyl | 0.99 | 135–6 | 2.0 | 1.4569 | .9992 |
| 2-ethylhexyl | 0.98 | 142 | 0.4 | 1.4594 | .9691 |

| (Vinyloxycarbonyl form) 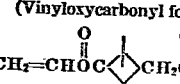 | | | | | |
|---|---|---|---|---|---|
| R=Ethyl | 1.009 | 113 | 2.0 | 1.4556 | 1.0209 |
| n-Butyl | 0.99 | 130–4 | 2.0 | 1.4560 | .9980 |
| 2-ethylhexyl | 1.007 | 138 | 0.1 | 1.4592 | .9686 |
| Hydronopyl | 1.004 | 170 | 0.1 | 1.4872 | 1.0287 |

The vinyl alkyl pinates of Table IV were reduced in the conventional manner thereby converting the vinyl groups to ethyl groups and producing the corresponding ethyl alkyl pinates or diethyl pinate. The ethyl alkyl esters were characterized by saponification equivalent, boiling point, refractive index, and density, and found to be identical with the respective mixed dialkyl pinates of Table III. The diethyl pinate was identified in similar manner. These results confirm that the configuration of the vinyl alkyl pinates with respect to the location of the vinyl and alkyl substituents is as depicted in Table IV.

EXAMPLE 7

*Divinyl pinate.*—Pinic acid, 82 g. (0.44 mole), was vinylated using the vinyl interchange reaction, as described for the vinyl interchange preparation of vinyl 2,2-dimethyl-3-(ethoxycarbonyl)cyclobutaneacetate in Example 6. The crude divinyl pinate was isolated without washing to remove the catalyst and acidic components. A total of 30 g. (0.126 mole) of pure divinyl pinate was obtained by a bulb-to-bulb distillation and finally distillation using an 18 inch column packed with ⅛ inch glass helices. It had the following characteristics: boiling point 110°–112° C., 2 mm.; $n_D^{20}$, 1.4667; $d^{20}$, 1.0343; hydrogenation equivalent, 1.99. The divinyl pinate was reduced, and the resulting diethyl ester was identified as diethyl pinate by its boiling point (108°–110° C., 1 mm.), refractive index ($n_D^{20}$, 1.4457), and density ($d^{20}$, 1.0123).

EXAMPLE 8

*Homopolymerizations*

Homopolymers were made from each of the seven vinyl alkyl pinates of Table IV, Example 6, the esters being freshly redistilled under reduced pressure prior to use. The general procedure for making the homopolymers was as follows: 5 g. of vinyl alkyl pinate, 10 ml. of water, 0.5 g. of a commercial sodium alkyl aryl polyether sulfate, 2 ml. of a 2.5% by weight aqueous solution of potassium persulfate, and a drop of lauryl mercaptan were charged into a 2-oz. polymerization bottle. The bottle was flushed with nitrogen, sealed with a cap containing a rubber gasket, and then tumbled end-over-end in a 50° C. constant temperature bath for the period of time indicated in Table V below. Any minor variations in the recipe are noted in Table V. The resulting polymer latex was coagulated in the usual way with sodium chloride-sulfuric acid-water coagulant solution. The coagulated polymer was then dissolved in benzene and precipitated by pouring the solution into methanol. The polymer was separated and freeze-dried under vacuum to give the final homopolymer product. The results of a number of homopolymerization experiments are given in Table V.

TABLE V.—HOMOPOLYMERIZATION OF VINYL ALKYL PINATES

| Monomer | Experiment No. | Polymerization time, hrs. | Conversion, Percent | Capillary softening Range, °C. | Inherent viscosity [1] | Minor variations in recipe |
|---|---|---|---|---|---|---|
| Vinyl ethyl pinate (vinyl acetate form, Table IV) | 1 [2] | 48 | 60 | 80–100 | 0.46 | Coagulated with saturated NaCl solution. |
| | 2 | 48 | 70 | 80–100 | 0.53 | Emulsion freeze dried and polymer reprecipitated. |
| | 3 | 48 | 60 | 78–105 | | 1 ml. of 5% K₂S₂O₈ solution. |
| | 4 | 67.5 | 70 | 70–107 | 0.62 | 20 g. monomer, 20 ml. water, 2.5 g. of a commercial sodium alkyl aryl polyether sulfate, 4 ml. of 2.5% K₂S₂O₈ solution. |
| Vinyl ethyl pinate (vinyloxycarbonyl form, Table IV) | 5 | 24 | 75 | 65–100 | 0.58 | 1 g. of a commercial sodium alkyl aryl polyether sulfate, 1 ml. 5% K₂S₂O₈ solution. |
| | 6 [3] | 24 | 70 | 68– 92 | 0.60 | 1 ml. of 5% K₂O₂S₈ solution. |
| | 7 | 12 | 80 | 68– 95 | 0.55 | Do. |
| | 8 | 48 | 80 | 80– 90 | 0.69 | 2 ml. of 1% K₂S₂O₈ solution. |
| | 9 | 48 | 10 | 60– 86 | 0.38 | 1 ml. of 1% K₂S₂O₈ solution. |
| Vinyl n butyl pinate (vinyl acetate form, Table IV) | 10 [4] | 52 | 80 | 68– 86 | 0.73 | |
| Vinyl n butyl pinate (vinyloxycarbonyl form, Table IV) | 11 [5] | 52 | 70 | 64– 84 | 1.20 | |
| | 12 | 72 | 77 | | 0.81 | 20 g. monomer, 20 ml. water, 4 ml. 2.5% K₂S₂O₈ solution. |
| Vinyl 2 ethylhexyl pinate (vinyl acetate form, Table IV) | 13 | 90 | 90 | (6) | | |
| | 14 [7] | 96 | (8) | (6) | 0.47 | 20 g. monomer, 20 ml. water, 2.5 g. of a commercial sodium alkyl aryl polyether sulfate, 4 ml. of 2.5% K₂S₂O₈ solution. |
| Vinyl 2 ethylhexyl pinate (vinyloxycarbonyl form, Table IV). | 15 | 48 | 50 | (6) | 0.41 | |
| | 16 [9] | 90 | 65.5 | (6) | 0.38 | 20 g. monomer, 20 ml. water, 2.5 g. of a commercial sodium alkyl aryl polyether sulfate. |
| Vinyl hydronopyl pinate (vinyloxycarbonyl form, Table IV). | 17 [10] | 168 | 50 | 65– 80 | 0.17 | Double recipe. |

[1] 0.25 g. Homopolymer per 100 ml. benzene solvent at 25° C.
[2] Homopolymer—Anal. calcd. for C₁₃H₂₀O₄: C, 64.98; H, 8.39; found: C, 64.51; H, 8.31.
[3] Homopolymer—Anal. calcd. for C₁₃H₂₀O₄: C, 64.98; H, 8.39; found: C, 65.13; H, 8.48.
[4] Homopolymer—Anal. calcd. for C₁₅H₂₄O₄: C, 67.13; H, 9.02; found: C, 66.61; H, 9.17.
[5] Homopolymer—Anal. calcd. for C₁₅H₂₄O₄: C, 67.13; H, 9.02; found: C, 67.00; H, 9.16.
[6] Sticky polymer; almost fluid at room temperature.
[7] Homopolymer—Anal. calcd. for C₁₉H₃₂O₄: C, 70.33; H, 9.94; found: C, 69.60; H, 9.75.
[8] Conversion could not be measured because of sticky nature of the polymer.
[9] Homopolymer—Anal. calcd. for C₁₉H₃₂O₄: C, 70.33; H, 9.94; found: C, 69.62; H, 9.75.
[10] Homopolymer—Anal. calcd. for C₂₂H₃₄O₄: C, 72.89; H, 9.45; found: C, 72.75; H, 9.59.

There was very little difference in the polymerization behavior of the isomeric pairs of vinyl alkyl pinates or in the properties of their homopolymers. The esters with the larger alkyl groups polymerized more slowly. All of the homopolymers had low softening points and were inclined to be slightly sticky. All were soluble in benzene, and most of them had inherent viscosities in the range of 0.4 to 0.6 as prepared. Larger and smaller molecular weight materials can be obtained as noted in the table.

EXAMPLE 9

*Copolymerizations*

The vinyl alkyl pinates of Table IV, Example 6, used for the homopolymerizations of Example 8, were also found to copolymerize readily with vinyl chloride to produce copolymers of a variety of compositions. The general procedure for making the copolymers was as follows: A polymerization bottle was charged with the desired weight of vinyl alkyl pinate monomer, water (20 ml.), a commercial sodium alkyl aryl polyether sulfate (2.5 g.), potassium persulfate solution (2 ml. of 2.5% solution) and a drop of lauryl mercaptan. The bottle was flushed out with nitrogen and cooled in a Dry Ice-acetone bath. Then an excess of liquid vinyl chloride was added and the bottle allowed to warm up so vinyl chloride distilled out of the bottle until the desired weight remained. The bottle was then tightly capped and after it had warmed up to room temperature was placed in a 45° C. bath and tumbled end-over-end for the time noted in Table VI below. The bottles were then removed, cooled and opened. The latex was coagulated with salt-sulfuric acid solution. The polymer was collected, washed well with water, methanol and ether, and then dissolved in tetrahydrofuran to give about a 10% solution. This solution was then poured into excess methanol which was stirred in a mechanical blendor. The polymer was collected on a filter, washed with methanol, and dried for two days under reduced pressure. When polymer samples were prepared for evaluation of their mechanical characteristics, several bottles were charged and polymerized at one time and the contents combined and worked up together. The results of a number of copolymerization experiments are given in Table VI.

TABLE VI.—COPOLYMERIZATION OF VINYL ALKYL PINATES WITH VINYL CHLORIDE

| Experiment No. | Vinyl alkyl pinate, type ester | G. | Vinyl chloride, g. | Polymerization time, hrs. | Conversion, percent | Softening range, °C. | Inherent viscosity [1] | Chlorine content, percent | Ester incorporation, percent |
|---|---|---|---|---|---|---|---|---|---|
| 1 | Vinyl ethyl pinate (vinyl acetate form) | 2 | 18 | 88 | 34 | 148-170 | 0.77 | 52.86 | 7.5 |
| 2 | do | 4 | 16 | 88 | 65 | 137-160 | 0.77 | 47.71 | 16.0 |
| 3 | do | 4 | 16 | 64 | 26 | 138-158 | 0.72 | 50.67 | 11.8 |
| 4 | do | 4 | 16 | 88 | 78.5 | 138-155 | 0.92 | 46.82 | 17.5 |
| 5 [2] | do | 6 | 14 | 88 | 74 | 122-152 | 0.82 | 42.59 | 25.0 |
| 6 [2] | do | 6 | 14 | 88 | 84 | 126-152 | 0.88 | 42.16 | 25.7 |
| 7 | Vinyl ethyl pinate (vinyloxycarbonyl form) | 2 | 18 | 96 | 18 | 175-185 | 0.71 | 52.79 | 7.5 |
| 8 | do | 4 | 16 | 72 | 48 | 128-150 | 0.69 | 48.00 | 15.5 |
| 9 | do | 4 | 16 | 72 | 48 | 136-144 | 0.70 | 47.84 | 15.8 |
| 10 | do | 4 | 16 | 88 | 60 | 125-155 | 0.79 | 47.44 | 16.4 |
| 11 | do | 4 | 16 | 168 | 86 | 135-165 | 0.93 | 46.82 | 17.5 |
| 12 [2] | do | 6 | 14 | 87.5 | 71 | 120-140 | 0.64 | 41.06 | 27.8 |
| 13 [2] | do | 6 | 14 | 88 | 75 | 123-148 | 0.79 | 41.09 | 26.1 |
| 14 [2] | do | 6 | 14 | 88 | 87.5 | 124-155 | 0.97 | 41.79 | 26.4 |
| 15 | Vinyl n-butyl pinate (vinyl acetate form) | 4 | 16 | 88 | 55 | 134-152 | 0.78 | 48.52 | 14.5 |
| 16 | do | 4 | 16 | 88 | 57 | 130-158 | 0.82 | 48.58 | 14.4 |
| 17 | do | 4 | 16 | 88 | 73 | 125-158 | 0.93 | 47.01 | 17.1 |
| 18 | do | 6 | 14 | 88 | 82 | 126-147 | 0.73 | 42.81 | 24.5 |
| 19 | Vinyl n-butyl pinate (vinyloxycarbonyl form) | 4 | 16 | 88 | 67 | 137-152 | 0.74 | 48.35 | 14.8 |
| 20 [2] | do | 6 | 14 | 88 | 65 | 135-157 | 0.91 | 43.91 | 22.6 |
| 21 [2] | do | 6 | 14 | 88 | 71 | 130-153 | 0.91 | 43.28 | 23.7 |
| 22 | Vinyl 2-ethylhexyl pinate (vinyl acetate form) | 4 | 16 | 168 | 84 | 130-157 | 0.73 | 48.44 | 14.6 |
| 23 | do | 6 | 14 | 168 | 72 | 120-148 | 0.89 | 44.61 | 21.4 |
| 24 | do | 6 | 14 | 168 | 87 | 125-142 | 0.75 | 41.98 | 26.0 |
| 25 | Vinyl 2-ethylhexyl pinate (vinyloxycarbonyl form) | 4 | 16 | 88 | 21.5 | 125-153 | 0.74 | 51.11 | 10.0 |
| 26 | do | 4 | 16 | 168 | 78 | 132-155 | 0.71 | 46.51 | 18.0 |
| 27 [2] | do | 6 | 14 | 168 | 89 | 135-153 | 0.65 | 42.16 | 25.7 |
| 28 [2] | do | 6 | 14 | 168 | 73.5 | 130-152 | 0.73 | 41.80 | 26.4 |
| 29 [2] | Vinyl hydronopyl pinate (vinyloxycarbonyl form) | 6 | 14 | 168 | 54 | 135-154 | 0.55 | 46.65 | 17.8 |
| 30 [2] | do | 6 | 14 | 168 | 57 | 138-158 | 0.65 | 46.16 | 18.6 |

[1] Measured at a concentration of 0.25 g. of polymer in 100 ml. of tetrahydrofuran at 25° C.
[2] Copolymers produced in these experiments were used in tests to evaluate their mechanical characteristics (see Table VII below).

Selected copolymers of each type produced in the experiments reported in Table VI were tested for their mechanical characteristics, using standard test procedures. The results of the tests are given in Table VII below. ASTM tests 638—52T were employed to determine all the characteristics of the copolymers given in Table VII, except for the torsional flex temperatures ($T_f$) which were determined by ASTM Test D 1043—51. The copolymers were rigid plastics. It was possible to process them at lower processing temperatures than those required for processing the conventional poly (vinyl chloride-vinyl acetate) copolymers.

TABLE VII—MECHANICAL CHARACTERISTICS OF COPOLYMERS OF VINYL ALKYL PINATES WITH VINYL CHLORIDE

| Copolymer of vinyl chloride with— | Milling temp., °C. | Molding temp., °C. | Yield point, p.s.i. | Modulus of elasticity | Tensile strength at break, p.s.i. | | Elongation, percent | $T_f$, °C. |
|---|---|---|---|---|---|---|---|---|
| | | | | | Original cross section | Cross section at break | | |
| Vinyl ethyl pinate (vinyl acetate form) [1] | 270 | 280 | 7,800 | 205,000 | 4,870 | 8,440 | 29 | +55 |
| Vinyl ethyl pinate (vinyloxycarbonyl form) [2] | 270 | 280 | 7,720 | 205,000 | 4,580 | 7,920 | 19 | +55 |
| Vinyl n-butyl pinate (vinyl acetate form) [3] | 290 | 290 | 7,670 | 187,000 | 4,340 | 7,200 | 11 | +52 |
| Vinyl n-butyl pinate (vinyloxycarbonyl form) [4] | 270 | 280 | 7,490 | 192,000 | 5,380 | 10,300 | 138 | +54 |
| Vinyl 2-ethylhexyl pinate (vinyl acetate form) [5] | 250 | 260 | 6,800 | 174,000 | 4,710 | 8,160 | 22 | +46 |
| Vinyl 2-ethylhexyl pinate (vinyloxycarbonyl form) [6] | 250 | 260 | 6,470 | 150,000 | 5,260 | 9,950 | 139 | +42 |
| Vinyl hydronopyl pinate (vinyloxycarbonyl form) [7] | 290 | 290 | 8,150 | 203,000 | 4,990 | 7,290 | 12 | +61 |

[1] Equal parts by weight of copolymers from Experiments 5 and 6, Table VI, blended for use in these tests.
[2] Equal parts by weight of copolymers from Experiments 12, 13, and 14, Table VI, blended for use in these tests.
[3] Copolymer from Experiment 18, Table VI.
[4] Equal parts by weight of copolymers from Experiments 20 and 21, Table VI, blended for use in these tests.
[5] Copolymer from Experiment 23, Table VI.
[6] Equal parts by weight of copolymers from Experiments 27 and 28, Table VI, blended for use in these tests.
[7] Equal parts by weight of copolymers from Experiments 29 and 30, Table VI, blended for use in these tests.

We claim:
1. A pinate of the formula

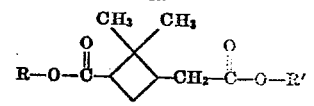

wherein R and R' are radicals selected from the group consisting of vinyl and alkyl, either of said R and R' being vinyl when the other is one of said vinyl and alkyl radicals.

2. The pinate of claim 1 wherein R is vinyl and R' is alkyl.
3. The pinate of claim 1 wherein R is alkyl and R' vinyl.
4. The pinate of claim 1 wherein R is vinyl and R' is 2-ethylhexyl.
5. The pinate of claim 1 wherein R is 2-ethylhexyl and R' is vinyl.
6. The pinate of claim 1 wherein R is vinyl and R' is hydronopyl.
7. The pinate of claim 1 wherein R is hydronopyl and R' is vinyl.
8. The pinate of claim 1 wherein R and R' are both vinyl.
9. A process comprising esterifying pinic acid having the formula

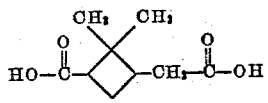

with an equimolar quantity of an alcohol having the formula ROH wherein R is an alkyl radical to form the 3-carboxycyclobutane form of the half ester of pinic acid having the formula

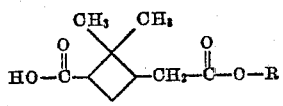

wherein R has the same significance as above, isolating said half ester, subjecting the half ester to vinyl interchange to produce a vinyl alkyl pinate having the formula

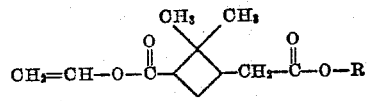

wherein R has the same significance as above, and isolating the vinyl alkyl pinate.

10. The process of claim 9 wherein R is 2-ethylhexyl.
11. The process of claim 9 wherein R is hydronopyl.
12. A process comprising esterifying pinic acid having the formula

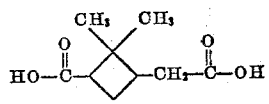

with an excess of an alcohol having the formula ROH wherein R is an alkyl radical to form the symmetrical diester having the formula

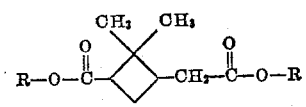

wherein R has the same significance as above, isolating the diester, saponifying the diester to form the acetic acid form of the half ester of pinic acid having the formula

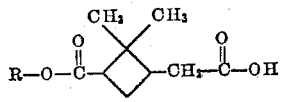

wherein R has the same significance as above, isolating said half ester, subjecting the half ester to vinyl interchange to produce a vinyl alkyl pinate having the formula

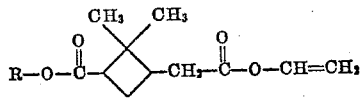

wherein R has the same significance as above, and isolating the vinyl alkyl pinate.

13. The process of claim 12 wherein R is 2-ethylhexyl.
14. The process of claim 12 wherein R is hydronopyl.
15. A process comprising subjecting pinic acid having the formula

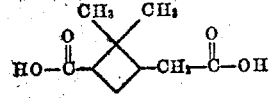

to vinyl interchange to produce divinyl pinate having the formula

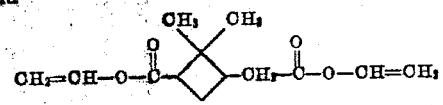

and isolating the divinyl pinate.

16. A process comprising esterifying pinic acid having the formula

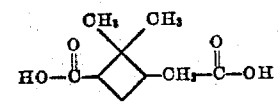

with an equimolar quantity of an alcohol having the formula ROH wherein R is an alkyl radical to form the 3-carboxycyclobutane form of the half ester of pinic acid having the formula

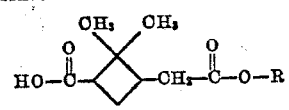

wherein R has the same significance as above, isolating said half ester, esterifying said half ester with an alcohol having the formula R'OH wherein R' is an alkyl radical to form the diester of pinic acid having the formula

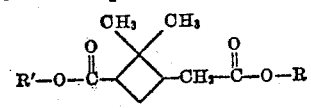

wherein R and R' have the same significance as above, isolating the diester, saponifying the diester to form the acetic acid form of the half ester of pinic acid having the formula

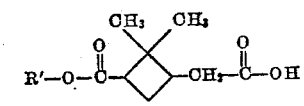

wherein R' has the same significance as above, isolating the acetic acid form of the half ester, subjecting the acetic acid form of the half ester to vinyl interchange to produce a vinyl alkyl pinate having the formula

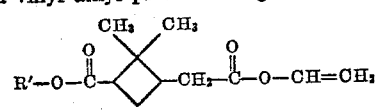

wherein R' has the same significance as above, and isolating the vinyl alkyl pinate.

17. A process comprising esterifying pinic acid having the formula

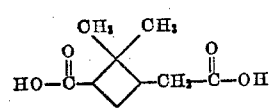

with an equimolar quantity of an alcohol having the formula ROH wherein R is an alkyl radical to form the 3-carboxycyclobutane form of the half ester of pinic acid having the formula

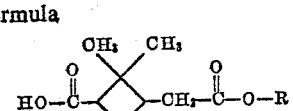

wherein R has the same significance as above, isolating said half ester, converting said half ester to the acid chloride of said half ester, esterifying said acid chloride of the half ester with an alcohol having the formula R'OH wherein R' is an alkyl radical to form the diester of pinic acid having the formula

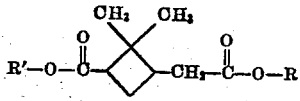

wherein R and R' have the same significance as above, isolating the diester, saponifying the diester to form the acetic acid form of the half ester of pinic acid having the formula

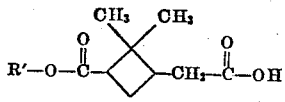

wherein R' has the same significance as above, isolating the acetic acid form of the half ester, subjecting the acetic acid form of the half ester to vinyl interchange to produce a vinyl alkyl pinate having the formula

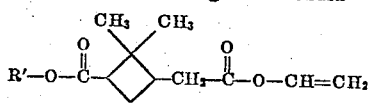

wherein R' has the same significance as above, and isolating the vinyl alkyl pinate.

18. A homopolymer of a pinate of claim 1.
19. A homopolymer of the pinate of claim 4.
20. A homopolymer of the pinate of claim 5.
21. A homopolymer of the pinate of claim 6.
22. A homopolymer of the pinate of claim 7.
23. A homopolymer of the pinate of claim 8.
24. A copolymer of vinyl chloride and a pinate of claim 1.
25. A copolymer of vinyl chloride and the pinate of claim 4.
26. A copolymer of vinyl chloride and the pinate of claim 5.
27. A copolymer of vinyl chloride and the pinate of claim 6.
28. A copolymer of vinyl chloride and the pinate of claim 7.
29. A copolymer of vinyl chloride and the pinate of claim 8.

References Cited in the file of this patent
UNITED STATES PATENTS 2,934,570    Goldberg et al.           Apr. 26, 1960
2,970,168    Horn et al.              Jan. 31, 1961

OTHER REFERENCES

Lewis et al., Journal Organic Chemistry, vol. 24, 1870–1872 (1959).

Lewis et al., Journal Organic Chemistry, vol. 25, 623–625 (1960).